US011836234B2

(12) United States Patent
Einberg et al.

(10) Patent No.: US 11,836,234 B2
(45) Date of Patent: *Dec. 5, 2023

(54) MATCHING AN USER TAKEN IMAGE WITH ACCESS CONTROL APPARATUS REFERENCES FOR PHYSICAL ACCESS CONTROL

(71) Applicant: ASSA ABLOY AB, Stockholm (SE)

(72) Inventors: Fredrik Einberg, Huddinge (SE); Fredrik Lindersson, Täby (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,923

(22) Filed: Oct. 10, 2022

(65) Prior Publication Data
US 2023/0030707 A1 Feb. 2, 2023

Related U.S. Application Data

(63) Continuation of application No. 17/272,002, filed as application No. PCT/EP2019/074915 on Sep. 17, 2019, now Pat. No. 11,468,719.

(30) Foreign Application Priority Data

Sep. 18, 2018 (SE) .................................... 1851103-0

(51) Int. Cl.
H04W 4/80 (2018.01)
H04L 9/08 (2006.01)
(Continued)

(52) U.S. Cl.
CPC ............ *G06F 21/32* (2013.01); *G06V 10/751* (2022.01); *G06V 40/16* (2022.01);
(Continued)

(58) Field of Classification Search
CPC .......... G06F 18/00; G06F 21/30; G06F 21/32; G06F 21/42; G06F 3/01; G06F 3/015;
(Continued)

(56) References Cited

U.S. PATENT DOCUMENTS 11,468,719 B2 * 10/2022 Einberg ................ H04L 9/0822
2005/0168321 A1 * 8/2005 Fitzgibbon ............... G07C 9/37
340/5.64

(Continued)

FOREIGN PATENT DOCUMENTS

EP 1693801 8/2006
WO WO 2009/128854 10/2009
(Continued)

OTHER PUBLICATIONS

Official Action for Sweden Patent Application No. 1851103-0, dated Apr. 15, 2019, 9 pages.
(Continued)

*Primary Examiner* — Dionne Pendleton
(74) *Attorney, Agent, or Firm* — Schwegman Lundberg & Woessner, P.A.

(57) ABSTRACT

It is provided a method for enabling access control for access to a physical space secured by a lock device. The method is performed in a security device and comprises the steps of: obtaining at least one image captured using a first camera of a portable key device, the at least one image being captured in a vicinity of the lock device; receiving a template decryption key from a lock device over a short-range communication link; obtaining a credential associated with the lock device; matching the at least one image with a plurality of templates, each template being associated with a lock device, which comprises obtaining the plurality of templates by decrypting encrypted templates using the template
(Continued)

decryption key; and wherein a positive match is a necessary condition for opening the lock device.

12 Claims, 5 Drawing Sheets

(51) Int. Cl.
  *G07C 9/00* (2020.01)
  *G06F 21/32* (2013.01)
  *G06V 10/75* (2022.01)
  *G06V 40/16* (2022.01)
(52) U.S. Cl.
  CPC ..... *G07C 9/00182* (2013.01); *G07C 9/00563* (2013.01); *H04L 9/0822* (2013.01); *G07C 2009/0019* (2013.01); *G07C 2009/0023* (2013.01)
(58) Field of Classification Search
  CPC . G06F 3/04883; G06F 16/53; G06Q 10/0832; G06Q 10/0833; G06Q 10/20; G06V 10/24; G06V 40/14; G06V 40/15; G06V 40/172; G06V 40/50; G06V 40/70; G06V 10/751; G06V 40/16; G06V 20/52; G06V 2201/033; G06V 40/168; G06V 40/175; G06V 40/20; G06V 40/25; G07C 2009/00412; G07C 2009/0042; G07C 9/00309; G07C 9/00563; G07C 9/00896; G07C 9/257; G07C 9/26; G07C 2009/0019; G07C 2009/0023; G07C 2209/63; G07C 9/00182; G07C 9/27; G07C 9/00; G07C 9/253; G07C 9/37; H04L 63/0492; H04L 9/0822; H04L 9/0844; H04L 9/3247; H04L 9/3297; H04N 7/185; H04N 23/57; H04N 7/181; H04N 7/186; H04N 7/188; H04W 4/80; H04W 12/0471; H04W 12/06; H04W 12/68; H04W 4/12; B60R 25/2045; B60R 25/25; B60R 25/305; E05B 19/0005; G06K 7/1417; G06T 2207/30232; G08B 13/196; G08B 3/10; G08B 7/06; H04M 9/02; H04R 1/028; H04R 3/00
  See application file for complete search history.

(56) References Cited

U.S. PATENT DOCUMENTS

| | | | |
|---|---|---|---|
| 2007/0103548 A1* | 5/2007 | Carter | H04N 7/188 348/E7.079 |
| 2013/0127591 A1 | 5/2013 | Shay et al. | |
| 2016/0036594 A1 | 2/2016 | Conrad et al. | |
| 2016/0105644 A1* | 4/2016 | Smith | G08B 13/19667 348/159 |
| 2016/0300410 A1* | 10/2016 | Jones | B60R 25/2045 |
| 2017/0061750 A1 | 3/2017 | Eyring et al. | |
| 2017/0256110 A1 | 9/2017 | Divincent et al. | |
| 2018/0357400 A1 | 12/2018 | Astrakhantsev et al. | |
| 2019/0279151 A1 | 9/2019 | Felice et al. | |
| 2019/0295344 A1 | 9/2019 | Bodell et al. | |
| 2020/0028672 A1 | 1/2020 | Tang | |
| 2020/0366670 A1 | 11/2020 | Cordiner et al. | |
| 2022/0051496 A1 | 2/2022 | Einberg et al. | |

FOREIGN PATENT DOCUMENTS

| | | |
|---|---|---|
| WO | WO 2016/092302 | 6/2016 |
| WO | 2020058294 | 3/2020 |

OTHER PUBLICATIONS

International Search Report and Written Opinion for International (PCT) Patent Application No. PCT/EP2019/074915, dated Dec. 12, 2019, 13 pages.
Second Written Opinion for International (PCT) Patent Application No. PCT/EP2019/074915, dated Sep. 9, 2020, 8 pages.
International Preliminary Report on Patentability for International (PCT) Patent Application No. PCT/EP2019/074915, dated Dec. 3, 2020, 17 pages.
Official Action for U.S. Appl. No. 17/272,002, dated Dec. 14, 2021 13 pages.
Notice of Allowance for U.S. Appl. No. 17/272,002, dated Jun. 16, 2022 10 pages.
"U.S. Appl. No. 17/272,002, Preliminary Amendment filed Feb. 26, 2021", 6 pgs.
"U.S. Appl. No. 17/272,002, Response filed Mar. 14, 2022 to Non Final Office Action dated Dec. 14, 2021", 8 pgs.
"International Application Serial No. PCT US2019 030536, Response to Written Opinion filed Jul. 16, 2020 to Written Opinion dated Dec. 12, 2019", 8 pgs.

* cited by examiner

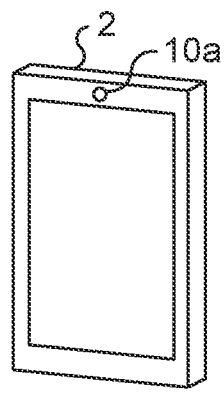
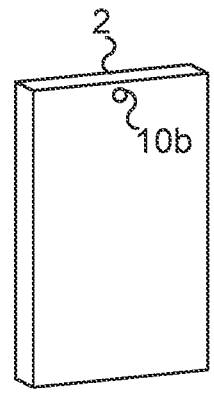
Fig. 2A　　　　　　　　　　Fig. 2B
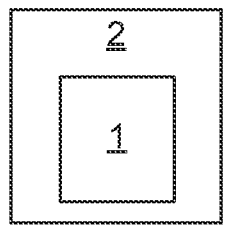
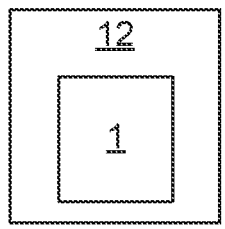
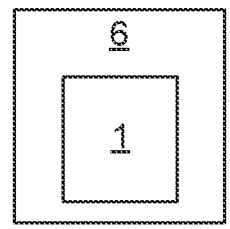
Fig. 3A　　　Fig. 3B　　　Fig. 3C　　　Fig. 3D

MATCHING AN USER TAKEN IMAGE WITH ACCESS CONTROL APPARATUS REFERENCES FOR PHYSICAL ACCESS CONTROL

CROSS REFERENCE TO RELATED APPLICATIONS

This application is a continuation of U.S. patent application Ser. No. 17/272,002 filed on Feb. 26, 2021, which is a national stage application under 35 U.S.C. 371 and claims the benefit of PCT Application No. PCT/EP2019/074915 having an international filing date of Sep. 17, 2019, which designated the United States, which PCT application claimed the benefit of Swedish Patent Application No. 1851103-0 filed Sep. 18, 2018, the disclosure of each of which are incorporated herein by reference.

TECHNICAL FIELD

The invention relates to a method, a security device, a computer program and a computer program product for matching an image with templates for access control.

BACKGROUND

Locks have evolved from traditional mechanical locks to electronic locks. Electronic locks are becoming increasingly popular for several reasons, such as flexibility, control and auditing capabilities.

An attacker attempting to get access to a space secured by a mechanical lock of course needs to be by the lock to e.g. attempt to pick the lock.

With electronic locks that are network connected, attacks are not geographically limited to the vicinity of the lock.

WO 2009/128854 A1 discloses physical access control using dynamic inputs from a portable communications device. WO 2016/092302 A1 discloses flexible security system for cash-in-transit. EP 1 693 801 A2 discloses biometric-based systems and methods for identity verification.

SUMMARY

It is an object to reduce the risk of an offsite attacker or hacker controlling access to a physical space.

According to a first aspect, it is provided a method for enabling access control for access to a physical space secured by a lock device. The method is performed in a security device and comprises the steps of: obtaining at least one image captured using a first camera of a portable key device; receiving a template decryption key from a lock device over a short-range communication link; obtaining a credential associated with the lock device; matching the at least one image with a plurality of templates, each template being associated with a lock device, which comprises obtaining the plurality of templates by decrypting encrypted templates using the template decryption key; and wherein a positive match is a necessary condition for opening the lock device.

The at least one image may be in the form of a video comprising a plurality of sequential images. The method may further comprise the steps of: obtaining movement data captured using movement sensors of the portable key device; and comparing a plurality of movements derived from the video in a time period with the obtained movement data over the same time period; wherein it is a necessary condition for opening the lock device that the movements detected in the video correspond to the obtained movement data.

The method may further comprise the step of: identifying a sequential light code from the video; wherein it is a necessary condition for opening the lock device that the light code matches a predetermined code.

The method may further comprise the step of: storing at least part of the at least one image to form part of an audit trail.

The method may further comprise the steps of: obtaining at least one face image captured using a second camera of the portable key device; and performing face recognition based on the at least one face image; wherein it is a necessary condition for opening the lock device that the face recognition is successful.

The step of storing may comprise storing at least part of the at least one face image.

The method may further comprise the step of: authenticating the portable key device.

The step of authenticating may be performed after the step of matching, when there is a positive match.

The step of authenticating may be is performed prior to the step of matching.

According to a second aspect, it is provided a security device for enabling access control for access to a physical space secured by a lock device. The security device comprises: a processor; and a memory storing instructions that, when executed by the processor, cause the security device to: obtain at least one image captured using a first camera of a portable key device; receive a template decryption key from a lock device over a short-range communication link; obtain a credential associated with the lock device; match the at least one image with a plurality of templates, each template being associated with a lock device, which comprises obtaining the plurality of templates by decrypting encrypted templates using the template decryption key; and wherein a positive match is a necessary condition for opening the lock device.

According to a third aspect, it is provided a computer program for enabling access control for access to a physical space secured by a lock device. The computer program comprising computer program code which, when run on an security device causes the security device to: obtain at least one image captured using a first camera of a portable key device; receive a template decryption key from a lock device over a short-range communication link; obtain a credential associated with the lock device; match the at least one image with a plurality of templates, each template being associated with a lock device, which comprises obtaining the plurality of templates by decrypting encrypted templates using the template decryption key; and wherein a positive match is a necessary condition for opening the lock device.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 2A-B are schematic diagrams illustrating the portable key device of FIG. 1;

FIGS. 3A-D are schematic diagrams illustrating embodiments of where a security device according to embodiments presented herein can be implemented;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description. Embodiments presented herein are based on the realisation that images from a camera can be used to verify that a user is in the vicinity of a particular lock device. This can be used to reduce the risk of an offsite attacker or hacker controlling access to a physical space. Optionally, the images can also be used for a greatly improved audit trail.

Figure 1:
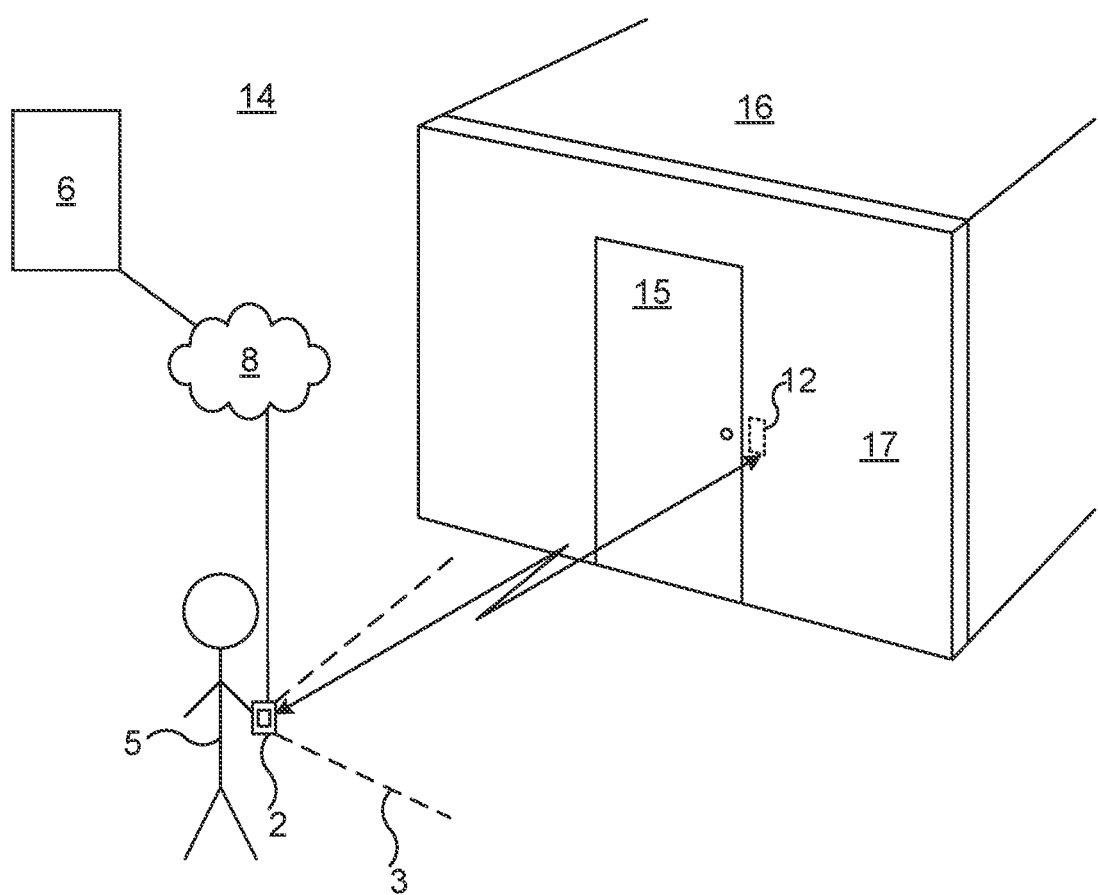
FIG. 1 is a schematic drawing illustrating an environment in which embodiments presented herein can be applied.

FIG. 1 is a schematic diagram showing an environment in which embodiments presented herein can be applied. Access to a physical space 16 is restricted by a physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. In order to control access to the physical space 16, by selectively unlocking the barrier 15, a lock device 12 is provided. The lock device 12 is an electronically controllable lock. The lock device 12 can be provided in the structure 17 surrounding the barrier 15 (as shown) or the lock device 12 can be provided in the barrier 15 itself (not shown). The lock device 12 is controllable to be in a locked state or in an unlocked state.

In order to evaluate whether a user 5 is to be granted access, the lock device 12 communicates with a portable key device 2 over a wireless interface. This allows selective unlocking of the lock device 12 based on the communication with the portable key device 2. In this way when a user approaches with a portable key device 2, an evaluation takes place to determine whether access should be granted or not. Additionally, the access control is conditioned on the user being in the vicinity of the lock device, which is verified using a camera of the portable key device, as described below. When the lock device 12 grants access, the lock device 12 is set in an unlocked state.

Setting the lock device 12 in an unlocked state can be implemented in a number of different ways. In the case when the lock device 12 evaluates the key, the lock device 12 can set itself in the unlocked state. If the key is evaluated in a remote host system, this can imply transmitting a signal to a lock controller over a wire-based communication, e.g. using a serial interface (e.g. RS485, RS232), Universal Serial Bus (USB), Ethernet, or even a simple electric connection, or alternatively using a wireless interface. When the lock device 12 is in an unlocked state, the barrier 15 can be opened and when the lock device 12 is in a locked state, the barrier 15 cannot be opened. In this way, access to a restricted physical space 16 is controlled by the lock device 12.

Alternatively or additionally, when access is granted, the barrier 15 can be triggered to be opened e.g. using a door opener.

The portable key device 2 can be implemented as a software application (also known as app) executing in a smart phone or other portable computing device. The portable key device 2 can optionally communicate with a central server 6 over a communication network 8, which can be a wide area network, such as the Internet, accessed e.g. via WiFi or a cellular network.

Optionally, also the lock device 12 can communicate with the central server 6 over the communication network 8.

In embodiments presented herein, a camera of the portable key device 2 is used to capture one or more images or videos of the environment of the lock device 12. The user 5 directs the camera of the portable key device 2 such that its field of view 3 encompasses the lock device 12 and/or the barrier 15. The captured image(s) are then compared against one or more image templates, where each image template is associated with a particular lock device 12. The matching is known in the art per se, and can e.g. be performed by a transform to align the images and subsequent correlation. Alternatively or additionally, the matching is based on identifying objects in the images and comparing the identified objects, and/or spatial relationships between identified objects. When the image(s) matches a lock device 12, the portable key device 2 is determined to be in the vicinity of the lock device 12 in question. This image matching can be combined with conventional access control procedures as known in the art per se, e.g. with authentication of the portable key device and authorisation based on communication between the lock device 12 and the portable key device 2. The authentication can occur before or after the image matching as shown, respectively, in FIG. 4A and FIG. 4B below.

FIGS. 2A-B are schematic diagrams illustrating the portable key device 2 of FIG. 1.

In FIG. 2A, a front facing camera 10a of the portable key device 2 is shown. This front facing camera 10a can be used to capture images of a face of a user, which images can be used for face recognition as described below.

In FIG. 2B, a rear facing camera 10b is shown. The rear facing camera 10b can be used to capture images of the surroundings of the lock device, to verify that a user is at a location of a particular lock device.

FIGS. 3A-D are schematic diagrams illustrating embodiments of where a security device 1 according to embodiments presented herein can be implemented. The security device 1 is the device that compares captured images against templates to determine whether the portable key device is in the vicinity of the lock device.

In FIG. 3A, the security device 1 is shown implemented in the portable key device 2. The portable key device 2 is thus the host device for the security device 1 in this implementation.

In FIG. 3B, the security device 1 is shown implemented in the lock device 12. The lock device 12 is thus the host device for the security device 1 in this implementation.

In FIG. 3C, the security device 1 is shown implemented in server 6. The server 6 is thus the host device for the security device 1 in this implementation.

In FIG. 3D, the security device 1 is shown implemented as a stand-alone device. The security device 1 thus does not have a host device in this implementation.

Figure 4A:
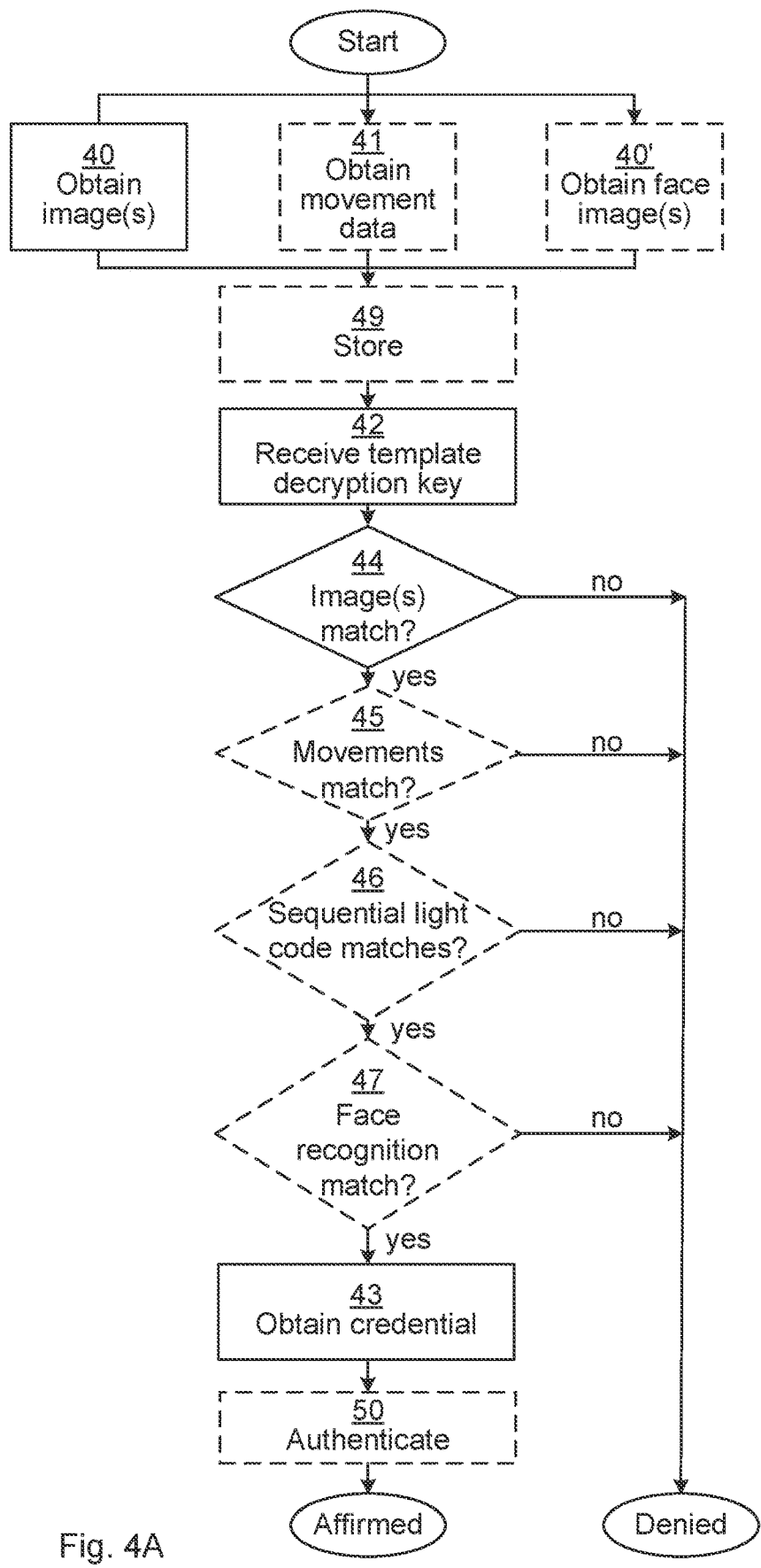
FIGS. 4A-B are schematic diagrams illustrating methods for enabling access control for access to a physical space secured by a lock device according to various embodiments.
Figure 4B:
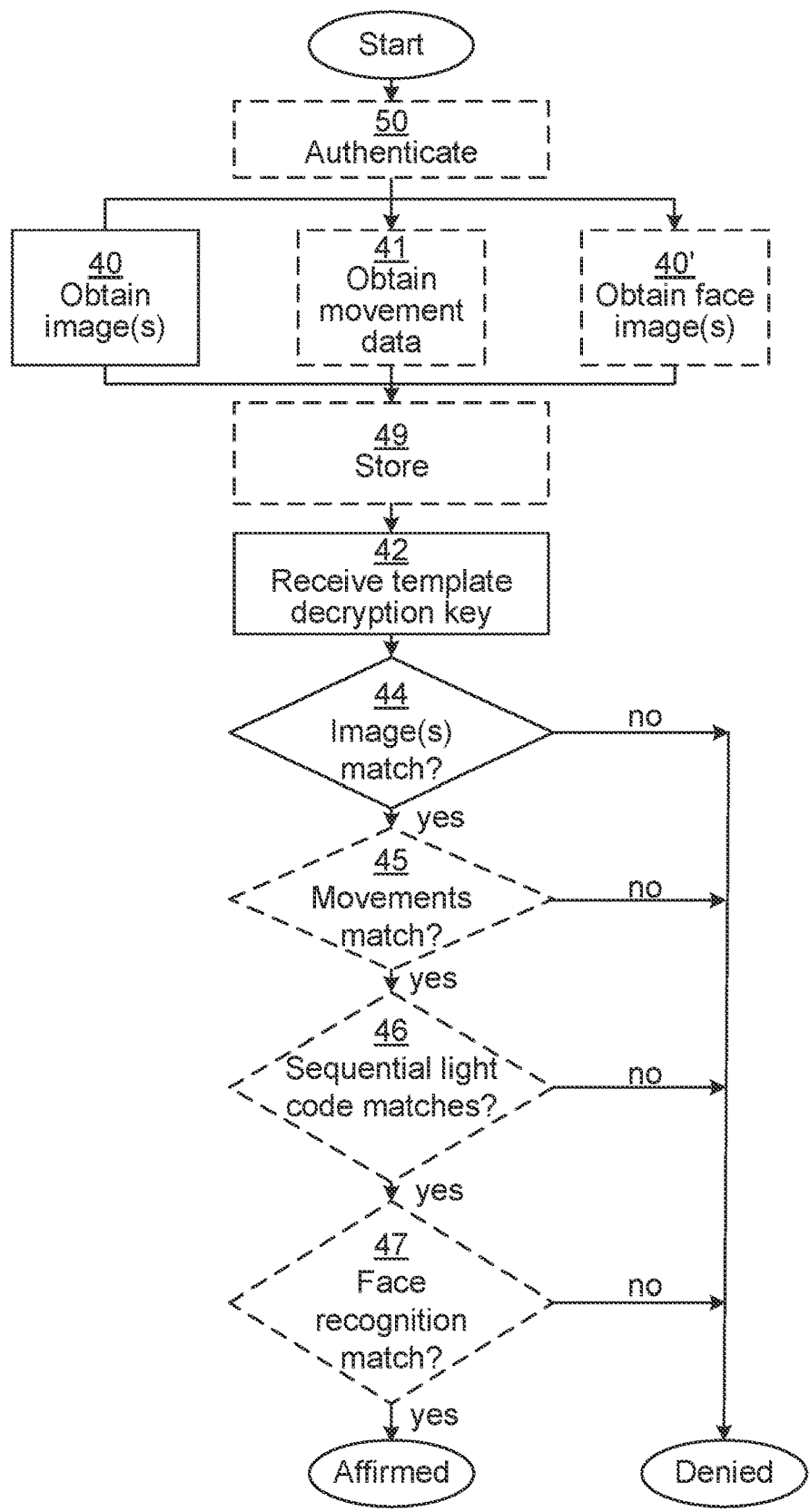

FIGS. 4A-B are schematic diagrams illustrating methods for enabling access control for access to a physical space secured by a lock device according to various embodiments. The method is performed in the security device, which in turn can form part or various host devices or be a stand-alone device as shown in FIGS. 3A-D.

In the following, a conditional step is a step where the method forks in two different possible paths. An optional step is a step that does not need to be performed.

First, embodiments illustrated by FIG. 4A will be described.

In an obtain image(s) step 40, the security device obtains at least one image captured using a first camera of a portable key device. The first camera can e.g. be the rear facing camera 10b of FIG. 2B. The user has previously been informed to capture images containing the lock device and/or barrier secured by the lock device. Hence, the at least one image has been captured in a vicinity of the lock device.

The at least one image can be one or more still images and/or the at least one image can be in the form of a video comprising a plurality of sequential images.

In an optional obtain movement data step 41, the security device obtains movement data captured using movement sensors of the portable key device. This step is only performed if the at least one image is in the form of a video. The movement sensors can e.g. be implemented using accelerometers and/or gyroscope sensors. The movement data is captured by the portable key device at the same time as the video is captured.

In an optional obtain face image(s) step 40', the security device obtains at least one face image captured using a second camera of the portable key device. The second camera can e.g. be the front facing camera 10a of FIG. 2A. The face image(s) can be captured at the same time as the at least one image captured in step 40.

In a receive template decryption key step 42, the security device receives a template decryption key from a lock device over a short-range communication link.

In an optional store step 49, the security device stores at least part of the at least one image to form part of an audit trail. When step 40' is performed, this can comprise storing at least part of the at least one face image. By storing images in the audit trail, the audit trail is greatly improved. Each audit trail entry then forms a proof of presence. Moreover, by storing the face image, the entry in the audit trail is also tied to a physical person.

In a conditional image(s) match step 44, the security device matches the at least one image with a plurality of templates. Each template is an image template being associated with a lock device. The conditional image(s) match step 44 comprises obtaining the plurality of templates by decrypting encrypted templates using the template decryption key. In other words, this comprises decrypting encrypted template data using the template decryption key received form the lock device. Since the decryption key is only received from the lock device, the encrypted template data (i.e. encrypted plurality of templates) can be safely stored in the key device without an attacker being able to read the template data (i.e. decrypted versions of the plurality of templates). As soon as the decrypted template data has been used, it can be deleted, to prevent an attacker having access to the portable key device from gaining access to decrypted template data. The decrypted data can e.g. only be available in transient memory (e.g. RAM) to further improve security.

When a match is not determined, the method ends in a denied state. Otherwise, the method ends in an affirmative state or continues to any of the optional steps 45, 46, 47, 43, or 50.

In an optional conditional movements match step 45, the security device compares a plurality of movements over a time period derived from the video with the obtained movement data over the same time period. This comparison relates to a several movements over the time period. When the movements detected in the video do not correspond to the obtained movement data, the method ends in a denied state. Otherwise, the method ends in an affirmative state or continues to any of the optional steps 46, 47, 43, or 50. This comparison of the two sources of movement data greatly improves certainty of whether the portable key device is actually in the vicinity of the lock device. Optionally, movement data derived from a video captured using the second camera is used to further ensure that the video data is not fake.

In an optional conditional sequential light code matches step 46 the security device identifies a sequential light code from the video. When the light code does not match the predetermined code, the method ends in a denied state. Otherwise, the method ends in an affirmative state or continues to any of the optional steps 47, 43 or 50. The light code can be provided by the lock device, e.g. using a LED (Light Emitting Diode) or other light source. In this way, certainty that the video is captured in real-time by the portable key device is further increased. The light code can be any suitable modulation of light over time, e.g. a blinking pattern, which is recordable in the video captured by the portable key device. Optionally, the light code represents an alphanumerical or binary code that is also provided from the lock device to the portable key device over radio. This code can optionally be unique to each key exchange session with the lock to prevent replay attacks of this light code.

In an optional conditional face recognition match step 47 the security device performs face recognition based on the at least one face image. When the face recognition is not successful, the method ends in a denied state. Otherwise, the method ends in an affirmative state or continues to any of the optional steps 43 or 40. Using face recognition ties also a person to the location of the lock device, further improving security.

In an obtain credential step 43, the security device obtains a credential associated with the lock device. If this step is performed, the security device can form part of the portable key device or the server. When multiple credentials for multiple lock devices are used by the portable key device, the lock identified in step 44 allows the appropriate credential to be obtained, to match the lock device in question. The appropriate credential can be obtained from memory of the portable key device or from the server, when the security device forms part of the server. When the security device forms part of the server, the appropriate credential can be obtained from the server itself or from another database with which the server can communicate.

In an optional authenticate step 50, the security device authenticates the portable key device as known in the art per se, e.g. using BLE, NFC or any other suitable current or future authentication procedure. The authentication is based on the credential obtained in step 43.

When the method ends in the affirmative state, the lock can be opened, conditional on the conventional access control prior to or after this method. In other words, a positive match is a necessary condition for opening the lock device.

When the method ends in a denied state, the lock cannot be opened.

It is to be noted that there may be alternative procedures for opening the lock, e.g. with an electronic and/or mechanical master key overriding the methods described herein. In other words, whenever the term 'necessary' is used herein, it is to be as construed as applicable only in the context of the presented method.

Looking now to FIG. 4B, only new or modified steps compared with those shown in FIG. 4A will be described.

Figure 5:
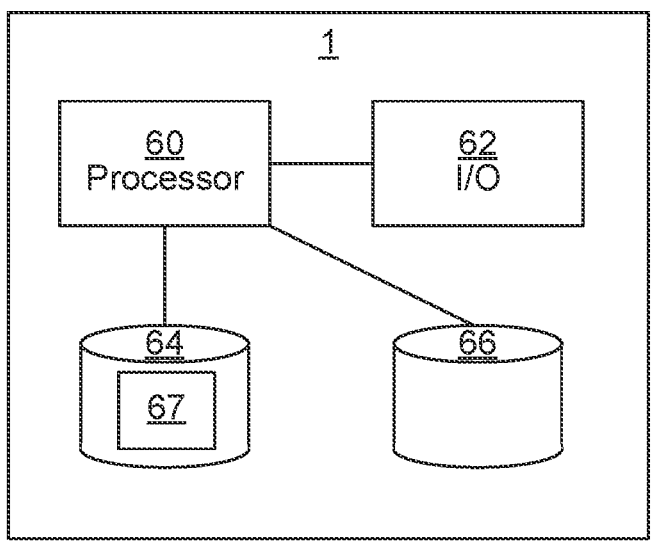
FIG. 5 is a schematic diagram illustrating components of the security device of FIGS. 3A-D.

In FIG. 4B, the optional authentication step 50 is performed before the matching steps 44-47. Specifically, the authentication step 50 here takes place prior to the obtain image(s) step 40. FIG. 5 is a schematic diagram illustrating components of the security device 1 of FIGS. 3A-D. It is to be noted that one or more of the mentioned components can be shared with the host device, when present. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 4A-B above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The security device 1 further comprises an I/O interface 62 for communicating with external and/or internal entities. Optionally, the I/O interface 62 also includes a user interface. Other components of the security device 1 are omitted in order not to obscure the concepts presented herein.

Figure 6:
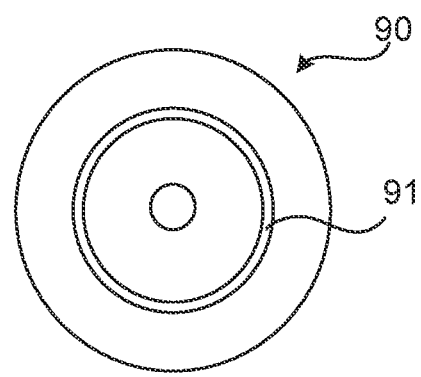
FIG. 6 shows one example of a computer program product 90 comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for enabling access control for access to a physical space secured by a lock device, the method being performed in a security device and comprising the steps of:
obtaining at least one image captured using a first camera of a portable key device;
matching the at least one image with a plurality of templates, each template being associated with a lock device; and
wherein a positive match is a necessary condition for opening the lock device.

ii. The method according to embodiment i, wherein the at least one image is in the form of a video comprising a plurality of sequential images.

iii. The method according to embodiment ii, further comprising the steps of:
obtaining movement data captured using movement sensors of the portable key device; and
comparing movements derived from the video with the obtained movement data;
wherein it is a necessary condition for opening the lock device that the movements detected in the video correspond to the obtained movement data.

iv. The method according to embodiment ii or iii, wherein the method further comprising the step of:
identifying a sequential light code from the video;
wherein it is a necessary condition for opening the lock device that the light code matches a predetermined code.

v. The method may further comprise the step of:
obtaining a credential associated with the lock device.

vi. The method according to embodiment v, further comprising the step of:
receiving a template decryption key from a lock device over a short range communication link;
wherein the step of matching comprises decrypting encrypted template data using the template decryption key.

vii. The method according to any one of the preceding embodiments, further comprising the step of:
storing at least part of the at least one image to form part of an audit trail.

viii. The method according to any one of the preceding embodiments, further comprising the step of:
authenticating the portable key device.

ix. The method according to embodiment viii, wherein the step of authenticating is performed after the step of matching, when there is a positive match.

x. The method according to embodiment viii, wherein the step of authenticating is performed prior to the step of matching.

xi. The method according to any one of the preceding embodiments, further comprising the steps of:
obtaining at least one face image captured using a second camera of the portable key device; and
performing face recognition based on the at least one face image;
wherein it is a necessary condition for opening the lock device that the face recognition is successful.

xii. The method according to embodiment xi when dependent on embodiment vii, wherein the step of storing comprises storing at least part of the at least one face image.

xiii. A security device for enabling access control for access to a physical space secured by a lock device, the security device comprising:
a processor; and
a memory storing instructions that, when executed by the processor, cause the security device to:
obtain at least one image captured using a first camera of a portable key device;
match the at least one image with a plurality of templates, each template being associated with a lock device; and
wherein a positive match is a necessary condition for opening the lock device.

xiv. A computer program for enabling access control for access to a physical space secured by a lock device, the computer program comprising computer program code which, when run on an security device causes the security device to:
obtain at least one image captured using a first camera of a portable key device;
match the at least one image with a plurality of templates, each template being associated with a lock device; and
wherein a positive match is a necessary condition for opening the lock device.

xv. A computer program product comprising a computer program according to embodiment xiv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A security device for enabling access control for access to a physical space secured by a lock device, the security device comprising:
a processor; and
a memory storing instructions that, when executed by the processor, cause the security device to:
obtain at least one image captured using a first camera of a portable key device held by a user, wherein the at least one image is in the form of a video comprising a plurality of sequential images;
obtain movement data captured using movement sensors of the portable key device;
match the at least one image with a plurality of templates, each template being associated with a lock device; and
compare movements derived from the video with the obtained movement data;
wherein it is a necessary condition for opening the lock device that there is a positive match between an image and a template, and it is a necessary condition for opening the lock device that the movements detected in the video correspond to the obtained movement data.

2. A non-transitory computer readable medium storing a computer program for enabling access control for access to a physical space secured by a lock device, the computer program comprising computer program code which, when run on a security device, causes the security device to:
obtain at least one image captured using a first camera of a portable key device held by a user, wherein the at least one image is in the form of a video comprising a plurality of sequential images;
obtain movement data captured using movement sensors of the portable key device;
match the at least one image with a plurality of templates, each template being associated with a lock device; and
compare movements derived from the video with the obtained movement data;
wherein it is a necessary condition for opening the lock device that there is a positive match between an image and a template, and it is a necessary condition for opening the lock device that the movements detected in the video correspond to the obtained movement data.

3. A method for enabling access control for access to a physical space secured by a lock device, the method being performed in a security device and comprising:
obtaining at least one image captured using a first camera of a portable key device held by a user, wherein the at least one image is in the form of a video comprising a plurality of sequential images;
obtaining movement data captured using movement sensors of the portable key device;
matching the at least one image with a plurality of templates, each template being associated with a lock device; and
comparing movements derived from the video with the obtained movement data;
wherein it is a necessary condition for opening the lock device that there is a positive match between an image and a template, and it is a necessary condition for opening the lock device that the movements detected in the video correspond to the obtained movement data.

4. The method according to claim 3, wherein the method further comprises:
identifying a sequential light code from the video;
wherein it is a necessary condition for opening the lock device that the light code matches a predetermined code.

5. The method according to claim 3, further comprising:
obtaining a credential associated with the lock device.

6. The method according to claim 5, further comprising:
receiving a template decryption key from a lock device over a short range communication link;
wherein the matching comprises decrypting encrypted template data using the template decryption key.

7. The method according to claim 3, further comprising:
storing at least part of the at least one image to form part of an audit trail.

8. The method according to any claim 3, further comprising:
authenticating the portable key device.

9. The method according to claim 8, wherein the authenticating is performed after the matching, when there is a positive match.

10. The method according to claim 8, wherein the authenticating is performed prior to the matching.

11. The method according to claim 3, further comprising:
obtaining at least one face image captured using a second camera of the portable key device; and
performing face recognition based on the at least one face image;
wherein it is a necessary condition for opening the lock device that the face recognition is successful.

12. The method according to claim 9, wherein the storing comprises storing at least part of the at least one face image.

* * * * *